Sept. 29, 1936. L. JAENICHEN 2,056,007

GARDENING TOOL

Filed Feb. 23, 1934

INVENTOR.

Louis Jaenichen

BY

Swan, Type & Hardesty

ATTORNEYS.

Patented Sept. 29, 1936

2,056,007

UNITED STATES PATENT OFFICE 2,056,007

GARDENING TOOL

Louis Jaenichen, Springfield Township, Oakland County, Mich.

Application February 23, 1934, Serial No. 712,582

2 Claims. (Cl. 97—63)

This invention relates to gardening devices, and more particularly to an improved garden tool for cultivating, mulching, working the soil, and for killing or pulling from the ground undesired weeds or plants. An important object of the invention is the provision of such a tool incorporating a working element which may be easily sunk into the earth and pulled or pushed back and/or forth, well below the surface, for the purpose of very rapidly and easily mulching or cultivating the soil, at the same time pulling up or cutting off and thus killing undesired weeds and plants, as the working element passes their roots transversely.

A further object is the incorporation in such a tool of a relatively slender elongated working element so constructed that despite its filamentary nature it is so supported that its full tensile strength at all times resists its being bent or broken.

Another object is the provision of improved mounting, securing and tensioning means for such filamentary working element.

Other objects and advantages will be apparent from the following description, wherein reference is made to the accompanying drawing illustrating two suitable embodiments of my invention, and wherein similar reference numerals designate similar parts throughout the several views.

Figure 1:
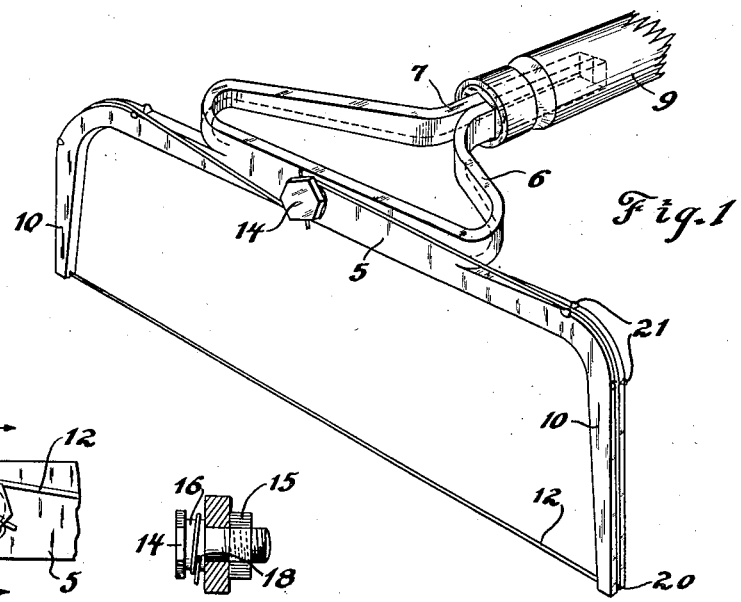
Figure 1 is a perspective view of one form of gardening tool incorporating the principles of my invention, the handle being partly broken away.

Referring now to the drawing, reference character 5 designates the upper portion of a frame of generally inverted U-contour, of relatively rigid construction, and which may be formed of a single initially straight strap metal blank cut and bent to the form shown in Figure 1. The transverse upper portion is provided with means for attachment to suitable manipulating or operating means, being in the present instance equipped with integral rearwardly bent arms 6, the end portions 7 of which are bent toward and lie parallel and close to each other to adapt them to be inserted in a socket (undesignated) in the end of a suitable handle, as 9. In the shown construction the supporting arms 10 for the working element are integrally bent downwardly from the lower portions of the split ends of the transverse upper frame portion 5, and may be of any desired length, and preferably rigid.

Between the lower extremities of the arms 10 may be stretched a cutting or working blade shown as a relatively small but strong wire 12, adapted to serve as a working element. The form and gauge of the working element are of course optional, however, and might be varied without affecting the principles of the invention. I have found it to be important however that the supporting framework and arms 5–10 be substantially rigid and the working element 12 tightly stretched, so that it cannot bend or vibrate to any material degree during use.

Figure 2:
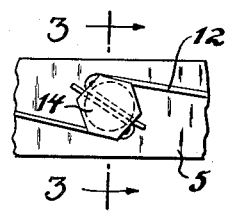
Figure 2 is a fragmentary enlarged front elevational view of the combined securing and tensioning means for the working element.
Figure 3:
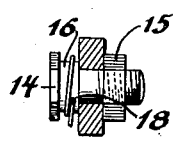
Figure 3 is a detailed section taken substantially on the line 3—3 of Figure 2 and looking in the direction of the arrows.

For securing the working element and providing means for adjustment of the tension thereof a shouldered bolt 14 is employed, extending through the upper mid portion of the frame and securable against turning by means of a nut 15. The shouldered portion 16 of the bolt projects from the frame and is provided with a transverse hole as 18 of sufficient size to receive both ends of the wire, which are passed therethrough from opposite ends as shown in Figure 2. The lower extremities of the arms 10 are slotted as at 20 to receive the wire, which extends around the outer edges of the arms 10 and partially along the top of the upper frame portion 5, being confined and prevented from sliding off the outer edges of the frame by a channel formed by integral struck out portion 21, formed by partly indenting the sides of the frame adjacent the outer edge to deform the metal outwardly on opposite sides of the wire.

Upstanding retaining edge portions are thus formed enabling the filamentary working element to be run around the outside of the frame in the manner clearly shown in Figure 1, and to the adjusting bolt 14, where its ends are inserted in the retaining aperture 18 after being wrapped around the shouldered portion of the bolt for a part of a turn, to prevent the working element from being pulled from the aperture by the tension upon it. It will be obvious that by merely turning the bolt to wind the wire or working element upon it, such element may be drawn at both ends to tighten it, and by the reverse operation it may be loosened or removed as desired.

I have found that by utilizing in this manner a frame of very rigid construction, and employing strong steel wire, tightly stretched, it is virtually impossible to bend the wire during use of the tool. This together with its high tensile strength insures the long life of the wire, and in fact makes it almost impossible to break it in the ordinary service to which the tool may be put.

In using the tool it is merely necessary to thrust the prongs or legs 10 carrying the working element well beneath the ground surface and to pass the device back and forth; thus easily and rapidly mulching and cultivating the soil and at the same time pulling up or cutting off and destroying all undesired weeds or plants.

While it will be apparent that the illustrated embodiments of my invention herein disclosed are calculated to adequately fulfill the objects and advantages primarily stated, it is to be understood that the invention is susceptible to variation, modification and change within the spirit and scope of the subjoined claims.

I claim:

1. In a gardening tool, a frame adapted to be secured to a handle, comprising a sheet metal element longitudinally split at opposite ends to provide arms, the arms being bent in pairs in planes transverse to each other, two of the arms extending beside each to form a handle portion, and two extending in spaced relation, a filamentary working element tightly stretched between the last mentioned arms and spaced below the frame, said arms being of sufficient rigidity to remain and maintain the working element substantially unflexed during movement of said element through the earth in use of the tool.

2. In a gardening tool, a frame comprising an elongated sheet metal element split at its ends to form a plurality of arms, two of which are bent laterally in spaced relation, and two of which are bent in a plane transverse to the two first mentioned to form a handle securing portion, a central uncut portion between said split ends forming a connecting portion, the spaced arms projecting rigidly from the ends of the connecting portion, and the securing portion projecting from a mid-portion of the connecting portion, the lower ends of said spaced arms being transversely slotted, guiding portions carried by the backs of said arms and connecting portion, a combined securing and tensioning member carried by the frame, and a filamentary working element stretched between the ends of said arms and extending through said slots and guiding portions and secured at both ends to the securing and tensioning member.

LOUIS JAENICHEN.